United States Patent [19]

Dry et al.

[11] Patent Number: 5,198,019
[45] Date of Patent: Mar. 30, 1993

[54] MANUFACTURE OF IRON AND STEEL IN A DUPLEX SMELTER AND SOLID STATE OXIDE SUSPENSION PREREDUCER

[75] Inventors: Rodney J. Dry, Glen Waverley; Robert La Nauze, Camberwell, both of Australia

[73] Assignee: CRA Services Limited, Australia

[21] Appl. No.: 688,540

[22] PCT Filed: Dec. 20, 1989

[86] PCT No.: PCT/AU89/00544

§ 371 Date: Jun. 20, 1991

§ 102(e) Date: Jun. 20, 1991

[87] PCT Pub. No.: WO90/07010

PCT Pub. Date: Jun. 28, 1990

[30] Foreign Application Priority Data

Dec. 20, 1988 [AU] Australia .................. PJ2047/88

[51] Int. Cl.$^5$ .................................. C21B 13/06
[52] U.S. Cl. ............................. 75/500; 75/10.53
[58] Field of Search ........................ 75/500, 10.53

[56] References Cited

U.S. PATENT DOCUMENTS

| | | | |
|---|---|---|---|
| 2,805,929 | 9/1957 | Udy | 75/10.53 |
| 3,235,374 | 2/1966 | Mahony | 75/26 |
| 4,073,642 | 2/1978 | Collin et al. | 75/26 |
| 4,094,665 | 6/1978 | Collin et al. | 75/11 |
| 4,359,212 | 11/1982 | Bengtsson et al. | 266/172 |

FOREIGN PATENT DOCUMENTS

| | | |
|---|---|---|
| 1489383 | 5/1983 | Australia . |
| 0236801 | 5/1988 | European Pat. Off. . |
| 1086256 | 8/1960 | Fed. Rep. of Germany . |
| WO8403521 | 2/1984 | PCT Int'l Appl. . |
| 0827957 | 2/1960 | United Kingdom . |

OTHER PUBLICATIONS

"FluxFlow Process Gas Cleaning and Heat Recovery System" A. Ahlstrom Corp., Finland.

*Primary Examiner*—Peter D. Rosenberg
*Attorney, Agent, or Firm*—Sughrue, Mion, Zinn, Macpeak & Seas

[57] ABSTRACT

Prereduced iron oxides are supplied to a smelting vessel (1) for the production of iron or steel by directing a hot reducing offgas from the vessel (1) into a vertical riser duct (8) without substantial cooling of the offgas and by way of inlet (16), particulate iron oxide containing material is entrained in the hot reducing offgas as the gas is conveyed upwardly through the duct (8). The hot gas heats the entrained material to a temperature at which partial reduction of the iron oxide occurs, the hot gas thereby, losing sensible heat. Additional materials may be introduced to the duct (8) for entrainment in the gas. Particulate material is separated in a cyclone (9) from the gas and the separated partially reduced material is introduced to the smelting vessel by way of passage (12). The particulate material, or part of it may be recycled by way of passage (15) through the vertical rise duct before the partially reduced material is introduced to the smelting vessel and only part of the hot reducing offgas emitted by the vessel may be directed into the duct.

12 Claims, 2 Drawing Sheets

MANUFACTURE OF IRON AND STEEL IN A DUPLEX SMELTER AND SOLID STATE OXIDE SUSPENSION PREREDUCER

TECHNICAL FIELD

The present invention relates to the reduction of iron oxides and is particularly concerned with a process and apparatus for supplying pre-reduced iron oxide to a smelting vessel for the production of iron or steel.

BACKGROUND

Ferrous bath-smelting processes with direct injection of ore and reducing agents are attractive from a commercial point of view. This arises from the fact that ore fines can be fed directly, obviating the need for lump feed as required by the blast furnace. Further, steaming coal can be used as reducing agent without prior removal of volatile matter in coke ovens.

Reducing agent (usually coal) consumption on such a system can be excessive, however, and the key to efficient operation of the smelting vessel is post-combustion of smelter offgas. In one embodiment of this concept, an oxygen-containing gas is admitted into the space above the bath and some of the carbon monoxide and hydrogen present is oxidised to carbon dioxide and water. The heat thus liberated is transferred back to the bath, and this reduces the amount of reducing agent needed in the process. Such a system is described in Australian patent specification No. 74409/81 the contents of which are incorporated herein by reference.

The smelter offgas from such a process contains appreciable amounts of carbon monoxide and hydrogen, and leaves the main vessel at relatively high temperature (eg. 1600° C.). To further reduce the amount of reductant consumed in the overall process, it is beneficial to pre-reduce incoming iron ore feed with this offgas prior to admitting it to the smelting vessel. One such proposal is described in Australian patent specification No. 28044/84, in which the pre-reduction occurs in a shaft furnace.

Stickiness of particles under pre-reduction conditions is a potential problem. At temperatures above about 1000° C., particles begin to cling to surfaces and thus create serious difficulties in plant operation. To avoid this, it is necessary to arrange the process in such a way as to maintain pre-reduction temperatures in the range 800–1000° C. At temperatures much below 800° C., pre-reduction rates slow appreciably and excessive residence-times are needed.

The proposal in the aforementioned AU-28044/84 aims to avoid this difficulty by cooling the offgas in a preconditioning chamber in which the offgas is additionally reduced by an intensive mixing action between the gas and coal dust caused by a special grid or lattice-lining over which the gas is passed. A cyclone is then required to separate the coal dust from the reduced, cooled offgas, prior to passing the gas to a shaft furnace to reduce the iron ore. However, it would be anticipated that a buildup of the sticky particles would occur on the special grid or lattice-lining and other surfaces of the preconditioning chamber.

Australian patent specification No. 69827/87 proposes an alternative arrangement in which fine ore having a particle size up to a maximum of 0.1 mm is introduced directly into the hot reducing gas immediately downstream of the offgas outlet from the smelting vessel.

It is an object of the present invention to alleviate the disadvantages of the aforementioned proposals and particularly to facilitate the partial reduction of particulate iron oxide containing material in the smelter offgas in an improved range of particle sizes.

SUMMARY OF THE INVENTION

According to a first aspect of the present invention there is provided a process for supplying pre-reduced iron oxides to a smelting vessel which comprises directing a hot reducing offgas from the vessel into a vertical riser duct without substantial cooling of the offgas and conducting the reducing offgas upwardly through the riser duct, entraining particulate iron oxide containing material in the hot reducing offgas in the riser duct thereby cooling the offgas and simultaneously partially reducing the material as it is conveyed by the offgas through the riser duct, separating the partially reduced material from the offgas and introducing at least a proportion of said separated reduced material into the smelting vessel.

Further according to the first aspect of the present invention there is provided apparatus for supplying pre-reduced iron oxides to a smelting vessel, the apparatus comprising a circuit including the smelting vessel, an outlet for hot reducing offgas from the vessel, a vertical riser duct arranged to convey the offgas therethrough without substantial obstacle, the vertical riser duct being connected to the offgas outlet so as to receive the hot offgas therein without substantial cooling of the offgas, means for introducing iron oxide containing material to the vertical riser duct to cool the offgas and to simultaneously partially reduce the material as it is conveyed by the offgas through the iron duct, means for separating the partially reduced material from the offgas and means for introducing at least a proportion of said reduced material into the smelting vessel.

By the first aspect of the present invention there is provided a process and an apparatus for supplying pre-reduced iron oxides to a smelting vessel. This system comprises conducting hot smelter offgas (without substantial prior cooling) into a vertical riser duct into which particulate iron oxide material is fed. The offgas is cooled in the duct, and at the same time pre-reduction of the iron oxide material takes place. The duct is conveniently maintained in the gas velocity range 3–15 m/s with the entrained solids having a top size of not greater than 8 mm. The preferred maximum particle size is in the range of 0.1 to 6 mm. Advantageously the feed material comprises iron ore but other iron oxide containing materials may be suitable.

The temperature of the hot offgas entering the vertical riser duct is substantially at the temperature of the smelting vessel, for example in the range 1300° C. to 1800° C. and the introduction of the particulate material to the riser duct, primarily the iron oxide containing material but possibly also one or more of slag-forming agents such as limestone, anti-sticking agents and reducing agents, is adapted to quench the gas in the duct to within the range 800 to 1000° C., advantageously about 900° C., so as to alleviate the stickiness problems.

At or adjacent the top of the riser duct the separating means for separation of gas and solid is conveniently a cyclone or combination of cyclones. The partially reduced material which is removed from the gas in the separating means may be taken directly as pre-reduction product for feeding to the smelting vessel, or may be split and a portion, advantageously a major portion, returned to the lower region of the riser duct via a suitable return leg. The latter version requires a device for transferring hot solid against a pressure gradient in order to allow continuous re-injection into the riser duct. A loopseal (as used in circulating fluidized bed combustion units) is one device which would be suitable for this service.

The case which involves recirculation of solid from the separating means to the lower reaches of the riser duct amounts to circulating fluidized bed (CFB) pre-reduction. This is a most advantageous mode of operation, since by solids recirculation it is possible to maintain a larger inventory of solid in the riser duct and hence a longer solids residence-time in the pre-reduction environment. More effective quenching of the smelter offgas is obtained and particle stickiness is controlled more effectively. CFB operation also has the advantage of greater temperature uniformity along the riser duct axis, thus providing a more favourable chemical driving force for pre-reduction.

In the CFB mode the amount of material recirculated may be significantly greater than that fed (and removed as pre-reduction product). Under these conditions the exact location of feed and product removal points in the riser - return leg loop is not critical due to the dilution effect of the recirculating load.

Heat removal from the system may be needed in some form. Waste heat recovery is possible in a number of places, one example being steam tubes in an expanded loopseal as proposed for use with the CFB system. However, it is useful to be able to operate the pre-reduction apparatus as an offgas cooler (without solid, e.g. during start-up) and for this reason it may be desirable to position heat recovery surfaces along the main gas flow path. This may include providing cooling surfaces on the walls of the riser duct and/or on walls of the separating means. As an alternative, it may be desirable to split the smelter offgas into two streams and only admit to the riser duct that proportion required to meet the heat demand of the pre-reduction process. In this case there would be no need for internal heat recovery surfaces in the pre-reduction system.

The pre-reducing system of the first aspect of the present invention is advantageously utilized with a smelting vessel in which a post-combustion process is performed, such as is described in the aforementioned AU 74409/81, and in accordance with a second aspect of the present invention there is provided a process for the production of iron and/or iron-alloys from iron oxides which are partially reduced using offgas from a smelting vessel which has been subjected to at least partial post-combustion, the partially reduced iron oxides being fed to the smelting vessel for smelting by reaction with carbon-containing fuel and oxygen-containing gases, characterised in that the hot at least partially post-combusted offgas is introduced without substantial cooling into a vertical riser tube and conveyed upwardly therethrough and particulate iron oxides are entrained in the upwardly conveyed hot offgas to perform said partial reducing and to simultaneously cool the offgas. The pre-reduction chemistry will generally not require or allow metallization (i.e. greater than 30% pre-reduction of fresh iron ore used as the iron oxide containing material).

BRIEF DESCRIPTION OF THE DRAWINGS

Two embodiments of a process and apparatus in accordance with the present invention will now be described by way of example only with reference to the accompanying drawings in which.

DETAILED DESCRIPTION OF THE DRAWINGS

Figure 1:
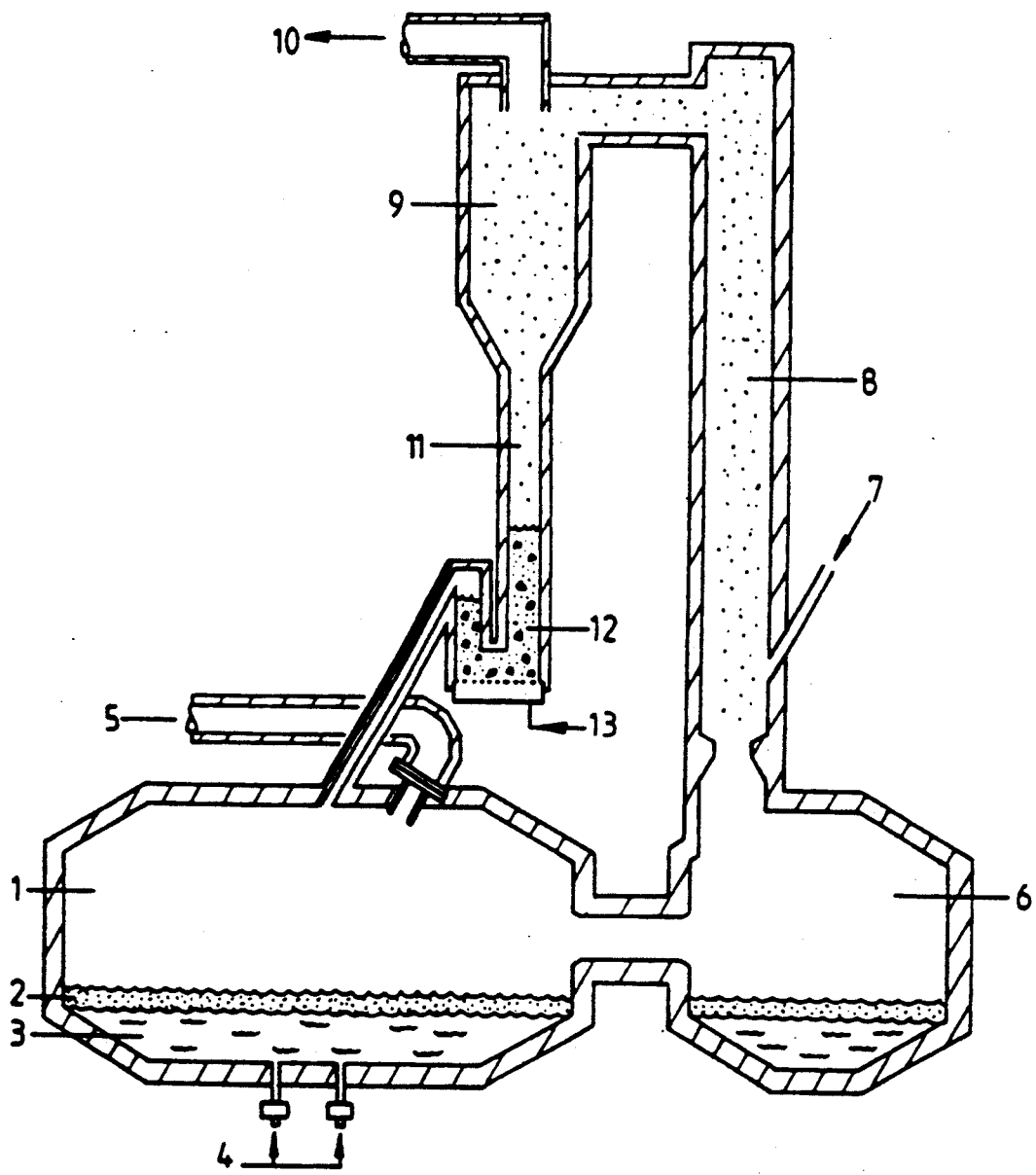
FIG. 1 illustrates a system for supplying pre-reduced material to a furnace by a once-through system.

FIG. 1 shows a refractory-lined smelting vessel which contains a gas space 1 and a melt comprising molten slag 2 and molten iron 3 with dissolved and dissolving carbon at a temperature of 1300 to 1800° C. Coal 4, optionally with oxygen-containing gas, is injected into the vessel below the melt and reacts with oxygen in the liquid phases to form mainly carbon monoxide and hydrogen. An oxygen-containing gas 5 is injected into the gas space, and partial combustion of carbon monoxide and hydrogen occurs. Heat from this post-combustion step is transferred back to the melt and the hot, dirty gas stream leaves the vessel at a temperature in the range 1300 to 1800° C. Australian patent specification 74409/81 describes this process in greater detail.

Once the gas leaves the main smelting vessel, it enters a secondary chamber 6. The function of the secondary chamber 6 is to disengage the gas from molten slag and iron by expansion of the gas and it is important that the gas does not cool significantly in the chamber 6. The chamber 6 may be replaced by a series of such chambers and possibly a cyclone to extract as much slag and molten material as possible, or may be omitted altogether.

Smelter offgas, still at a temperature close to that of the main smelting vessel and laden with liquid (and some solid) droplets, is ducted directly into the bottom portion of a vertical riser duct 8. Fresh iron oxide-rich material with a particle size up to 6 mm is introduced at 7, optionally mixed in minor proportions with slag-forming agents, anti-sticking agents and/or reducing agents. The inlet 7 opens immediately downstream of a restricted neck in the riser duct 8 which acts to accelerate the gas flow and increase admixing of the particulate matter with the gas. Hot gas cooling and solids pre-reduction takes place in the riser duct 8, which is designed to operate at a gas velocity in the range 3 to 15 m/s and to give an average suspension density of between 2 and 50 kg per cubic metre. The solids are reduced no further than wustite (FeO). Temperatures in the riser are generally between 800 to 1000° C., and cooling surfaces (not shown) are arranged on the walls of the riser duct to remove the requisite amount of heat. Such cooling surfaces are designed to minimise obstructing the flow of gas through the duct.

At the top of the riser duct 8 the mixture enters a cyclone 9. Solids are collected from the underflow 11 and are introduced to the main smelting vessel by an appropriate means. The gas stream 10 may be ducted to further waste heat recovery and particulate removal units (not shown).

The currently preferred illustrated means for transferring the partly reduced material from the low pressure underflow 11 to the main smelting vessel comprises a fluidized loopseal 12. A sealing bed of the partly reduced material is maintained in a fluidized state by feeding a suitable gas stream 13 such as nitrogen or any other gas not containing appreciable amounts of oxygen, via a distributor at the base of the loopseal. Pre-reduced solids overflow directly into a duct connected to the main smelting vessel.

It is recognized that the transfer means comprising the loopseal 12 may not be entirely satisfactory due to particulate build-up at the inlet to the smelting vessel, and it is possible that a system (not shown) by which the partly reduced material is injected into the smelting vessel may be advantageous.

Figure 2:
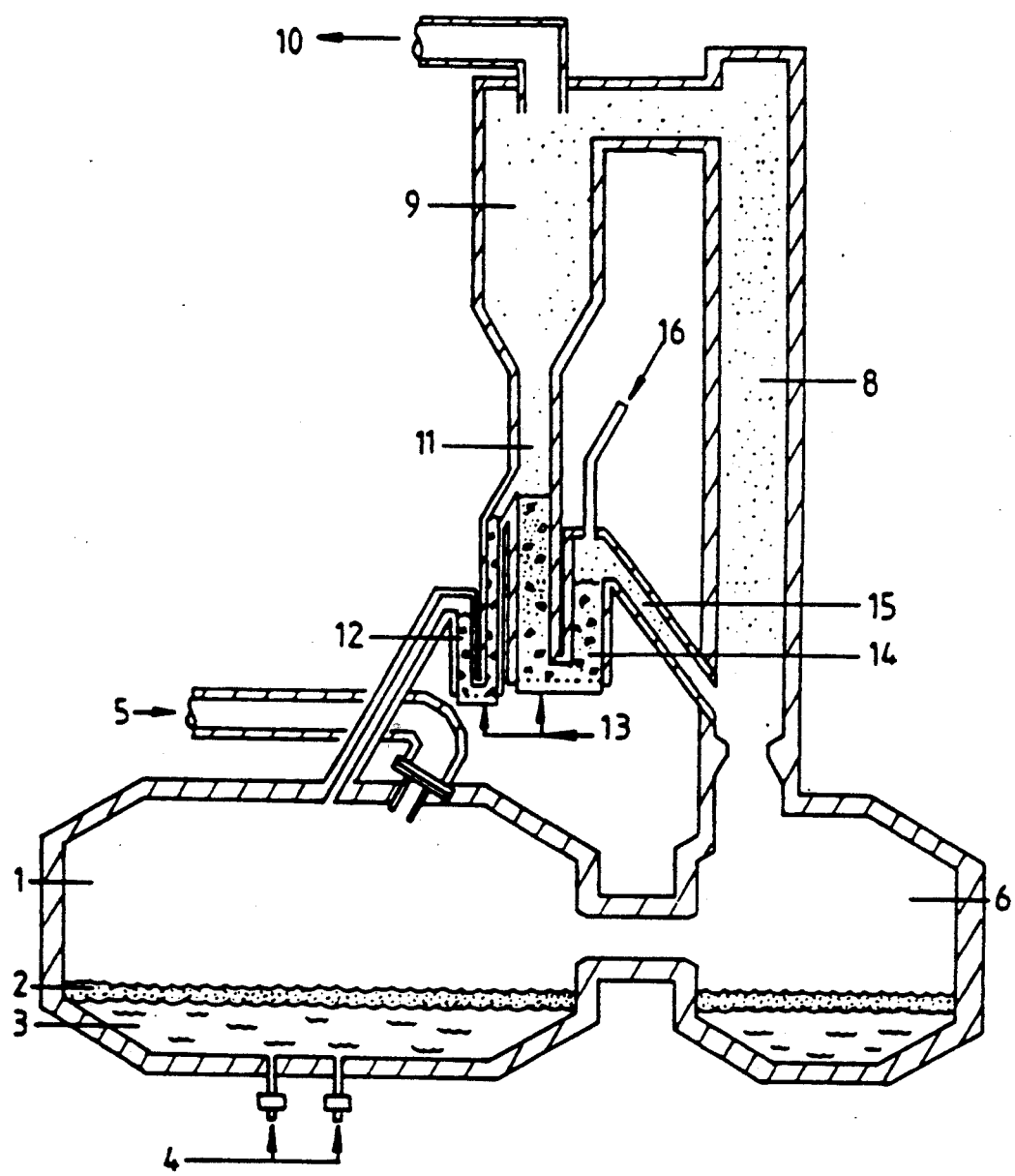
FIG. 2 illustrates a system for supplying pre-reduced material to a furnace by a recirculating system.

Referring now to FIG. 2, the operation of the circulating fluidised bed (CFB) version of the pre-reduction system differs from its non-recirculating counterpart described with reference to FIG. 1 in one principal sense only: fresh particulate iron oxide containing material is given the opportunity to pass through the riser duct 8 a plurality of times before leaving the pre-reduction environment. As shown in FIG. 2, a recycle conduit 14, 15 is provided and this allows multiple passes up the riser duct 8. This conduit is in the form of a loopseal similar to loopseal 12 which is also fluidized by the aeration gas 13. The conduit 15 opens into the riser duct 8 immediately downstream of the restricted necking in the duct.

Feed solids may be introduced into the CFB system (i.e. 8, 9, 11, 14 and 15) at any convenient location, the preferred point being by way of inlet 16 opening into conduit 15. The recirculated solids may be at a temperature in the range 700 to 900° C.

Suspension densities in the riser are higher than those in the once-through system, with average densities in the range 10 to 300 kg per cubic metres. Gas-solids contact times are increased by this means, and more effective particle stickiness control is achieved. The increased flow of particulate material around the CFB loop acts to even out temperatures, and this leads to a stronger and more uniform chemical driving force for the pre-reduction reactions.

EXAMPLES

Non-Recirculating Pre-Reduction

A pilot-plant riser reactor is held at a (riser) top temperature of 800° C. and is fed with gas at a rate of 44.6 normal cubic metres per hour. The composition of this gas (volume percent) is as follows:

| carbon monoxide | 18.2% |
| carbon dioxide | 16.4% |
| hydrogen | 3.9% |
| water | 6.5% |
| nitrogen | 55.3% |

Gas velocity in the riser is set at 6.2 m/s and iron ore with a top size of 1 mm is fed at a rate of 37 kg per hour. A pre-reduction level of 12 percent is achieved.

Recirculating Pre-Reduction

A pilot-plant CFB pre-reduction reactor is maintained at a riser top temperature of 900° C. and is fed with gas at a rate of 44.6 normal cubic metres per hour. The composition of this gas is as follows:

| carbon monoxide | 20.1% |
| carbon dioxide | 17.1% |
| hydrogen | 5.4% |
| water | 5.2% |
| nitrogen | 52.2% |

Gas velocity in the riser is set at 6 m/s and iron ore with a top size of 1 mm is fed at a rate of 14.3 kg per hour. A solids circulation rate of 1200 kg per hour is maintained, and average suspension density in the riser is held at 190 kg per cubic metre.

Average solids residence-time in the riser is 29 minutes and a pre-reduction level of 24.1 percent is achieved.

Recirculating Pre-Reduction with Lime Addition

A pilot-plant CFB pre-reduction reactor is maintained at a riser top temperature of 975° C. and is fed with gas at a rate of 44.6 normal cubic metres per hour. The composition of this gas is as follows:

| carbon monoxide | 19.1% |
| carbon dioxide | 17.6% |
| hydrogen | 4.5% |
| water | 5.6% |
| nitrogen | 53.1% |

Gas velocity in the riser is set at 6.1 m/s and iron ore with a top size of 1 mm is fed at a rate of 17.1 kg per hour. In addition to the iron ore, lime is fed into the CFB reactor at a rate of 0.9 kg per hour. A solids circulation rate of 500 kg per hour is maintained, and average suspension density in the riser is held at 89 kg per cubic metre.

Average solids residence-time in the riser is 10 minutes and a pre-reduction level of 23.7 percent is achieved.

Those skilled in the art will appreciate that the invention described herein is susceptible to variations and modifications other than those specifically described. It is to be understood that the invention includes all such variations and modifications which fall within the its spirit and scope. The invention also includes all of the steps, features, compositions and compounds referred to or indicated in this specification, individually or collectively, and any and all combinations of any two or more of said steps or features.

We claim:

1. A process for supplying pre-reduced iron oxides to a smelting vessel which comprises directing a hot reducing offgas from the vessel into a vertical riser duct without substantial cooling of the offgas and conducting the reducing offgas upwardly through the riser duct, entraining particulate iron oxide containing material in the hot reducing offgas in the riser duct thereby cooling the offgas and simultaneously partially reducing the material as it is conveyed by the offgas through the riser duct, separating the partially reduced material from the offgas and introducing at least a portion of said separated reduced material into the smelting vessel.

2. A process according to claim 1 wherein offgas flow through the vertical riser duct is maintained in the range 3 to 15 m/s.

3. A process according to claim 1 wherein the particulate material entrained in the offgas has a top size of not greater than 8 mm, preferably not greater than 6 mm.

4. A process according to claim 3 wherein the maximum particle size is in the range of 0.1 to 6 mm.

5. A process according to claim 1 wherein prior to entering the vertical riser tube the hot offgas passes through a separation step in which solid or molten material carried over from the smelting vessel in the offgas is separated from the offgas without substantial cooling of the offgas.

6. A process according to claim 1 wherein the hot reducing offgas enters the vertical riser duct at a maximum temperature of 1800° C.

7. A process according to claim 1 wherein temperature in the vertical riser duct after entrainment of particulate material in the offgas is maintained substantially in the range 800 to 1000° C.

8. A process according to claim 1 wherein one or more additives selected from the group of slag-forming agents, anti-sticking agents and reducing agents are also entrained in the offgas in the vertical riser duct.

9. A process according to claim 1 wherein the at least partially reduced material is separated from the offgas in one or more cyclones.

10. A process according to claim 1 wherein some of said separated reduced material is recycled to the vertical riser duct for entrainment in hot reducing offgas.

11. A process according to claim 10 wherein said particulate iron oxide containing material is mixed with said separated reduced material to be recycled, prior to entrainment in the offgas in the vertical riser duct.

12. A process for the production of iron and/or iron-alloys from iron oxides which are partially reduced using offgas from a smelting vessel which has been subjected to at least partial post-combustion, the partially reduced iron oxides being fed to the smelting vessel for smelting by reaction with carbon-containing fuel and oxygen-containing gases, characterised in that the hot at least partially post-combusted offgas is introduced without substantial cooling into a vertical riser tube and conveyed upwardly therethrough and particulate iron oxides are entrained in the upwardly conveyed hot offgas to perform said partial reducing and to simultaneously cool the offgas.

* * * * *